April 13, 1954  W. H. KLIEVER  2,674,883
TEMPERATURE MEASURING APPARATUS
Filed April 18, 1951

INVENTOR.
WALDO H. KLIEVER
BY George H. Fisher
ATTORNEY

Patented Apr. 13, 1954

2,674,883

UNITED STATES PATENT OFFICE 2,674,883

TEMPERATURE MEASURING APPARATUS

Waldo H. Kliever, Minneapolis, Minn., assignor to Minneapolis-Honeywell Regulator Company, Minneapolis, Minn., a corporation of Delaware Application April 18, 1951, Serial No. 221,621

10 Claims. (Cl. 73—360)

The present invention is concerned with a new and improved temperature measuring apparatus. More particularly, the present invention is concerned with a temperature measuring apparatus wherein the necessity of utilizing a standardizing battery or voltage source is eliminated and the apparatus itself produces a constant potential source which may be used for comparison with a voltage produced by a temperature sensing means.

In present day temperature measuring problems, the need often arises for providing a constant potential source which will not be affected by changes in altitude, pressure, or relative position in space. In measuring circuits incorporating thermocouples, the practice in the past has almost universally been to provide a standard battery with which the electrical potentials arising from the thermocouple might be compared in a suitable temperature measuring circuit. It has been found that standardizing batteries are not particularly adapted to aircraft use, particularly where the craft is subject to a variety of positions in space and wide variations of pressure and temperature. If the standardizing battery is to be eliminated from the thermocouple measuring circuit, some other potential comparison source must be provided and this source must have a potential output which is extremely accurate and substantially constant.

It has been found that certain thermocouple materials have nonlinear electrical outputs which vary and may, for example, have an output whose characteristic is parabolic in nature when the temperature is varied over a wide range. From this it is noted that for certain couples, when the hot junction is displaced in temperature from that of the cold junction by a predetermined amount, the electrical potentials of the hot junction and the cold junction will be equal and therefore there will be no output from the couple. The present invention utilizes this characteristic in producing a constant potential source as will be fully explained in the specification that follows.

It is therefore an object of the present invention to provide a new and improved temperature control apparatus having a constant potential source.

Another object of the present invention is to provide a constant potential source which has its potential produced by a current flowing to the heater for the hot junction of a thermocouple.

Still another object of the present invention is to provide a constant potential source including a thermocouple having a nonlinear output characteristic wherein, when the cold junction and the hot junction are separated by a predetermined temperature, the output voltages are equal and wherein electrical control temperature changing means is provided for maintaining a predetermined temperature differential between said junctions.

A further object of the present invention is to provide a constant potential source for a temperature indicating apparatus wherein a thermocouple having a hot junction and a cold junction are positioned with a temperature controlled enclosure and wherein a device responsive to the electrical potentials of said junctions is used to variably energize a heater associated directly with said hot junction.

These and further objects of the present invention will be understood upon considering the following specification and drawings of which:

Figure 1:
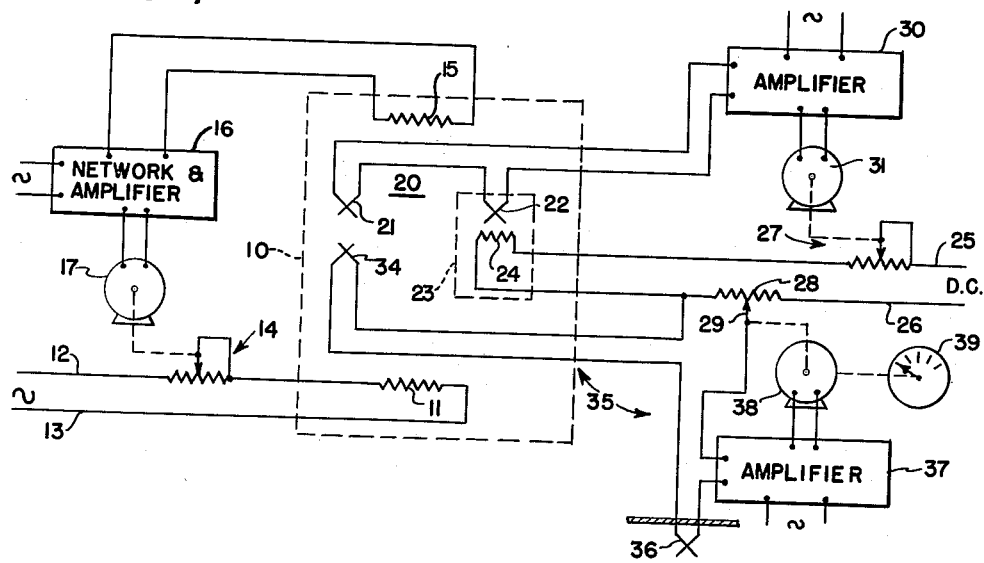
Figure 1 shows schematically the electrical circuit of the present invention.

Referring first to Figure 1, the numeral 10 represents an enclosure wherein the temperature is to be maintained substantially constant. Heat is supplied to the enclosure 10 by means of an electrical heater 11 which has power supplied thereto by means of a pair of conductors 12 and 13, the current flow passing through an adjustable current regulating rheostat 14. A temperature responsive resistor 15 is also positioned within the enclosure 10 and this resistor is utilized for obtaining a measure of the temperature within the enclosure 10. This resistor 15 is arranged to be connected in controlling relation to a control network and amplifier 16 which is connected to reversibly drive a control motor 17, the latter being arranged to reversibly drive the rheostat 14 and adjust the current flow to the resistor 11 so that the temperature within the enclosure 10 will remain constant. An example of the type of network and amplifier that may be used at 16 is discloseed in the A. P. Upton Patent 2,423,534, issued July 8, 1947.

Also positioned within the enclosure 10 is a thermocouple 20 having a cold junction 21 and a hot junction 22. The hot junction 22 is positioned in a further enclosure 23 which is preferably heat insulated from the rest of the apparatus. Also within the enclosure 23 and positioned in heat exchange relation to the hot junction 22 is a heater 24. The power for the resistor heater 24 is fed in through conductors 25 and 26, through a variable rheostat 27, and also through a slide wire resistor 28 having a slider 29.

The output potentials of thermocouple 20 are arranged to be detected by an amplifier 30 which is arranged to reversibly drive a motor 31. An example of an amplifier and motor combination using a thermocouple input is disclosed in the Jones Patent 2,306,479, issued December 29, 1942. The motor 31 is arranged to reversibly drive the rheostat 27 in accordance with the potentials derived from the thermocouple 20.

Also positioned within the enclosure 10 is a cold junction 34 of a temperature measuring thermocouple 35. A hot junction 36 of couple 35 may be located in any desired space wherein it is intended the temperature be measured. For detecting the electrical potentials of thermocouple 35 as well as those arising from the slide wire 28 and slider 29 is an amplifier 37 which is arranged to reversibly drive a motor 38. This amplifier motor combination may also be the same type as disclosed in the above mentioned Jones patent. The motor 38 is connected to reversibly drive the slider 29 over the slide wire 28 and is also connected to drive an indicator indicated generally by the numeral 39.

Figure 3:
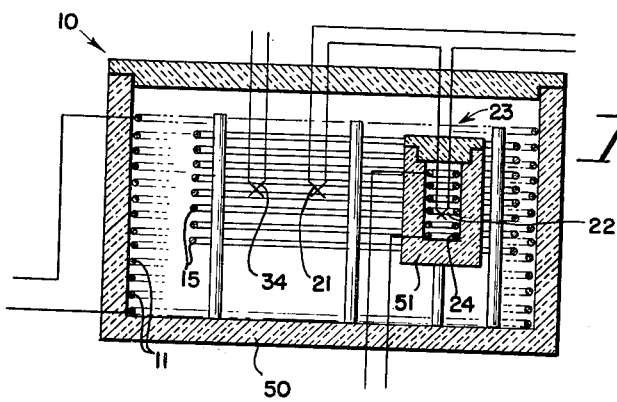
Figure 3 shows one form which the temperature controlled enclosure, for a portion of the apparatus, may assume.

Referring to Figure 3, there is shown one specific arrangement of the elements within the enclosure 10. The enclosure 10 is comprised of a suitable box like enclosure 50 which is preferably constructed of insulating material. The heater 11 is mounted on the inner wall of the insulation 50 and surrounds the sides of the box. The temperature sensing resistor 15 is positioned in spaced relation from the sides of the box 50 and surrounds the cold junctions 34 and 21 as well as a further enclosure 23, the latter comprising a further insulated box or enclosure 51. Positioned on the inner portion of the box 51 is the heater wire 24 and within the box is the couple 22. The box or enclosure 51 is mounted within the box 50 so as to permit air to circulate around the box so that the ambient temperature within the box 50 will be substantially the same throughout the entire box.

Operation

Figure 2:
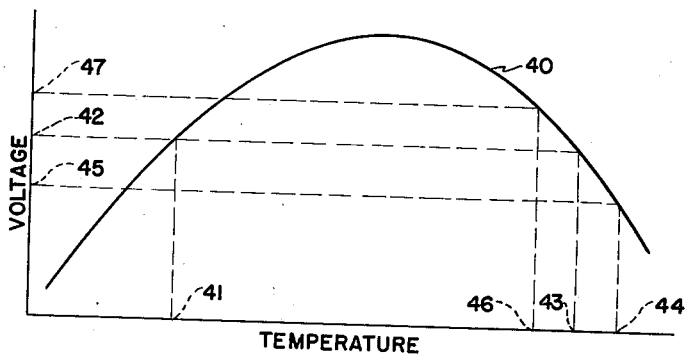
Figure 2 shows graphically a thermocouple characteristic curve and how the same is utilized in the present invention.

In considering the operation of the present apparatus, reference should first be made to Figure 2 where there is a plot of the output voltage versus temperature for the thermocouple 20. The abscissa of the graph is temperature and the ordinate of the graph is voltage. In the graph, the curve 40 represents the voltage temperature characteristic of the thermocouple 20. On the temperature axis, assume first that the temperature of the cold junction 21 of the thermocouple 20 is at point 41. This temperature will be the temperature of the ambient within the enclosure 10 as maintained by the heater 11. The output voltage of this junction will be at point 42 on the voltage axis. Assume also that the hot junction 22 of couple 20 is at a temperature indicated by the point 43 on the temperature axis. While the hot junction is at that temperature the output voltage taken from curve 40 and appearing upon the voltage axis will be at point 42 which will be the same as that arising from the cold junction 21. In order to maintain the hot junction 22 at the temperature point 43, it is necessary that heat be supplied thereto and this is supplied thereto by means of the heater 24. This will mean that the electrical power supplied to the heater 24 will require that a certain current be flowing from the direct current power lines 25 and 26 and this current flow will pass through the rheostat 27, heater 24, and slide wire resistor 28 back to the other power line 26. As long as the voltage of the direct current source on lines 25 and 26 remains constant, the current flow in the last traced circuit will remain constant. This will mean that there will be a constant voltage drop across the slide wire resistor 28.

The constant voltage drop across the slide wire 28 is utilized as a constant potential source for comparison with the output voltage of the thermocouple 35 on the input to the amplifier 37. With the temperature of the hot junction exposed to a predetermined temperature, there will be a certain voltage output from the thermocouple 35 which voltage will be added in series with the voltage picked off from the slide wire 28 by the slider 29. When the voltage from the slide wire 28 is equal and opposite the voltage from the thermocouple 35, there will be no input to the amplifier 37. If there is a difference between the potentials existing across the portion of the slide wire 28 covered by slider 29 and the output of the thermocouple 35, the amplifier 37 will detect this difference and will be effective to drive the motor 38 and the slider 29 to a position wherein a balance will be reached. In driving the slider 29, the motor 38 will also adjust the indicator 39 and the indicator will give an indication of the temperature of the hot junction 36.

If, for any reason, the direct current voltage on the lines 25 and 26 should change, for example increase, there will be an increased amount of current flowing in the circuit to the heater 24. This increased current flow will cause additional heating of the hot junction 22 so that its temperature, referring to Figure 2, will be increased to a point which may be point 44. When this increase in temperature of the hot junction 22 occurs, the thermocouple 20 will have an electrical output which will be the difference between point 42 and a point 45 on the voltage axis, the latter being the output voltage of the hot junction when exposed to the increased temperature from heater 24. With this output voltage from the couple 20, there will be an input signal on the amplifier 30 and the amplifier will be effective to drive motor 31. The motor will readjust the rheostat 27 so that the resistance in series with the heater 24 will be increased so as to cut down the amount of current flowing in the circuit. This current flow to the heater 24 will be reduced to that value which is necessary to cause the temperature of the hot junction 22 to go back to point 43, as indicated in Figure 2. When the junction has been changed back to this point 43, the current flow through the slide wire 28 will be as assumed above. This will mean that there will still be a constant voltage drop across the slide wire 28 so that it can continue to act as a constant potential source.

In the event that the voltage on the direct current source at lines 25 and 26 should decrease, there will be a decrease in the current flowing through the heater 24 and this decrease will cause the temperature of the hot junction 22 to decrease to a point, for example, 46 in Figure 2. This will mean that the output voltage of the hot junction will be changed to point 47 and the output will be reversed in polarity from that existing between points 42 and 45, as assumed above. The polarity of this output voltage will be effective to cause the amplifier 30 to drive the motor 31 in the direction to decrease the amount of resistance of rheostat 27. This decrease in resistance will cause an increase in the current flow through the heater 24 and therefore through the slide wire 28 until such time as the heater 24 has caused the hot junction 22 to change its temperature back to point 43. The changing of the temperature of junction 22 back to point 43 indicates that the amount of heat added to the couple, and therefore the amount of current flow through the slide wire 28, is at the desired value. As long as the current flow through the resistor 28 remains constant, there will be a constant potential drop thereacross and this will act as a constant potential source for comparison with the output voltage from the thermocouple 35.

It will thus be seen that there is provided a constant potential source and the constant potential is produced by the current flowing to a heater associated with the hot junction of the thermocouple, said heater maintaining a constant temperature differential between the temperature of the hot junction and the temperature of the cold junction of the couple.

From the foregoing it will be seen that there has been provided a new and improved constant potential source which eliminates the need for any standardizing potential sources and wherein the current flow to a heater which heats the hot junction of a thermocouple is utilized for obtaining a constant potential. While many modifications will be obvious to those skilled in the art, it is intended that the invention be limited solely by the scope of the appended claims of which I claim:

1. In a temperature measuring apparatus, the combination comprising, a first thermocouple having a first junction and a second junction, a controller connected to said thermocouple and operative in accordance with the potentials thereof, a heater exposed in heat exchange relationship with said first junction, a constant heat loss chamber for said heater and said first junction, means connecting said heater to said controller so that said controller will energize said heater to supply said constant heat loss and maintain the temperature of said first junction so that the potentials of said second junction and said first junction will be equal in magnitude, an electrical impedance connected in said heater circuit, said impedance having a relatively constant potential drop thereacross, a temperature measuring thermocouple having a reference junction and a sensing junction, said sensing junction being arranged for exposure to a medium whose temperature is to be measured, means connecting said second named thermocouple to means for indicating the temperature of said sensing junction, and a constant temperature controlled enclosure surrounding said second junction of said first thermocouple, said constant heat loss chamber, and the reference junction of said second thermocouple.

2. In a constant electrical current source, comprising in combination, a thermocouple having a hot and a cold junction, the voltage of said junctions being equal when said junctions are at a first and a second temperature respectively, a first constant temperature chamber for said cold junction to maintain said junction at said first temperature, a heater for said hot junction, a second chamber for said hot junction and said heater, said second chamber having a constant heat loss, a controller responsive to the difference between the voltages of said junctions, and means connecting said controller to control the energization of said heater to maintain the output voltage of said hot junction equal to that of said cold junction by maintaining the energization of said heater constant to heat said second chamber to said second temperature and to supply only said heat loss to said second chamber.

3. In a constant electrical current producing device, the combination comprising, a thermocouple having a reference and a sensing junction, a heater for said sensing junction, an enclosure for said heater and said sensing junction having constant heat loss therefrom, control means responsive to the electrical output of said thermocouple connected to said thermocouple and arranged to energize said heater to supply said constant heat loss, and a temperature controlled enclosure for said thermocouple to maintain said reference junction thereof at a predetermined temperature.

4. In a constant current electrical producing device, the combination comprising, a thermocouple having a first and a second junction, an electrical heater associated with said second junction, said heater and second junction having constant heat loss, a constant temperature chamber for said first junction, a controller connected to respond to the electrical potentials of said thermocouple and arranged to energize said heater to a degree to supply said constant heat loss and to maintain the electrical potential of said second junction equal to that of said first junction, and an electrical impedance connected in series with said heater having a constant potential thereacross due to the current flowing to said heater.

5. In a constant electrical current producing control, the combination comprising, a thermocouple having a cold junction and a hot junction, the electrical potential of said cold and hot junctions being equal at a first and a second temperature, an electrical heater positioned in heat exchange relation with said hot junction for normally heating said hot junction to said first temperature, a controller responsive to the electrical potentials of said thermocouple and connected to said thermocouple, means connecting said controller to energize said heater in accordance with the electrical potentials of said thermocouple so as to maintain the temperature of said hot junction at said first temperature, an electrical impedance connected in series with said heater, said impedance having a potential drop thereacross dependent upon the magnitude of the current flowing through said heater, and a temperature controlled enclosure surrounding said thermocouple and said heater to control the heat loss from said hot junction and to maintain said cold junction in an ambient which is substantially constant and equal to said second temperature.

6. A constant electrical potential producing device comprising in combination, a first thermal electrical potential producing device maintained at a constant temperature, a second thermal electrical potential producing device having constant heat loss, an electrical temperature changing means including a source of power exposed to control the temperature of said second device to supply said heat loss, a controller connected to respond to the electrical potentials of said first and second devices and arranged to control said temperature changing means in accordance with variations in said source of power, and an impedance connected in circuit with said source of power and said temperature changing means, said impedance having a constant potential thereacross regardless of the variations in said source of power.

7. A constant electrical potential producing device, comprising in combination, a first thermal electrical potential producing device maintained at a constant temperature, a second thermal electrical potential producing device having constant heat loss, means connecting said devices in an electrical circuit, temperature changing means including a source of power positioned adjacent said second device to supply said heat loss, said temperature changing means being electrically controlled and varying in effect in accordance with the magnitude of the current flow thereto, a controller connected to respond to the electrical potentials of said first and second devices and arranged to control the supply of electrical current from said source of power to said changing means to maintain the current supplied to said changing means constant independent of changes in said power source, an electrical impedance connected to said controller and responsive to the electrical current flowing through said temperature changing means, and a constant temperature controlled enclosure surrounding said first and second devices to maintain said first device at a constant temperature and to control the heat loss from said second device.

8. In combination, an insulated enclosure, a heater positioned on the surfaces of said enclosure to supply heat to said enclosure to maintain said enclosure at a first temperature, a temperature sensitive resistor positioned within said enclosure to sense the temperature therein, an electrical network including said resistor, an amplifier connected to a control motor and controlled by said network, said motor regulating the heat supplied by said heater, a first thermocouple having a hot and cold junction, both positioned within said enclosure, said thermocouple having substantially zero output when said cold and hot junctions are at said first and a second temperature respectively, a second enclosure within said first named enclosure surrounding said hot junction, said second enclosure having constant heat loss, a second heater in said second enclosure to supply said constant heat loss and maintain said hot junction at said second temperature, a second amplifier operatively connected to said first thermocouple, a motor driven by said second amplifier and arranged to regulate the flow of current to said second heater, a second thermocouple having a sensing junction and a reference junction, said reference junction being positioned in said first enclosure and said sensing junction being exposed to a medium whose temperature is to be measured, a third amplifier, a resistor connected in circuit with said second heater, and having an adjustable tap thereon, means connecting said second thermocouple in series with a portion of said resistor to the input of said third amplifier, and a motor controlled by said third amplifier and connected to adjust said tap.

9. In a constant current producing device, the combination comprising, a thermocouple having a cold junction and a hot junction, said thermocouple having zero output voltage when said cold and hot junctions are at a first and a second temperature respectively, means for maintaining said cold junction at said first temperature, means including a constant heat loss chamber and a source of power for maintaining said hot junction at said second temperature higher than said cold junction including an electrical heater to supply said constant heat loss, means controlled by the output of said thermocouple to regulate the supply of power to said heater from said source to compensate for changes in said source, and an electrical impedance in circuit with said heater having a substantially constant voltage drop thereacross regardless of changes in said source.

10. A constant current producing device comprising, a thermocouple having a hot and a cold junction with the voltage of said junctions being equal at a first and a second temperature, voltage responsive means connected to said thermocouple and including a controller to be adjusted in accordance with the output voltage of said thermocouple, a first constant temperature chamber maintained at said first temperature with said cold junction mounted within said chamber, a heater, a second chamber mounted within said first chamber with said hot junction and said heater mounted within said second chamber, a source of power, and circuit means including said controller connecting said source of power to said heater to energize said heater and maintain the temperature of said second chamber equal to said second temperature, the variations in said source of power being corrected for by said voltage responsive means responding to a change in output voltage of said thermocouple to adjust said controller to maintain substantially constant current flowing through said heater.

References Cited in the file of this patent
UNITED STATES PATENTS

| Number | Name | Date |
| --- | --- | --- |
| 1,206,304 | Chubb | Nov. 28, 1916 |
| 2,170,193 | Godsey | Aug. 22, 1939 |
| 2,312,022 | Brooks | Feb. 23, 1943 |
| 2,595,814 | Rich et al. | May 6, 1952 |